United States Patent [19]

Fayal

[11] 4,209,558
[45] Jun. 24, 1980

[54] NONSPLITTING MOLDED PLASTIC STRAP CONFIGURATION

[75] Inventor: James E. Fayal, Stonington, Conn.

[73] Assignee: Greene Plastics Corporation, Hope Valley, R.I.

[21] Appl. No.: 17,194

[22] Filed: Mar. 5, 1979

[51] Int. Cl.² .............................................. A47G 29/10
[52] U.S. Cl. ...................................... 428/28; 40/2 A; 70/456 R; 264/328; 428/16
[58] Field of Search .................. 24/3 K; 40/2 A, 330; 70/456 B, 456 R, 457, 458, 459; 428/16, 28, 43; 150/40; 264/293, 328

[56] References Cited

U.S. PATENT DOCUMENTS

| | | | |
|---|---|---|---|
| 3,620,057 | 11/1971 | Holland | 70/456 R |
| 3,863,477 | 2/1975 | Klein | 70/456 R |

*Primary Examiner*—Henry F. Epstein

[57] ABSTRACT

During injection molding of a plastic key tag or the like having an integral strap appendage with longitudinally spaced apertures formed therein for accommodating a fastener securing the strap in a looped configuration, a weakened weld line extending between the apertures is created. To discourage eventual splitting of the looped strap along this weld line, a relieved section is molded in the strap at a location calculated to reduce the lateral tensile stresses acting on this weld line.

10 Claims, 6 Drawing Figures

NONSPLITTING MOLDED PLASTIC STRAP CONFIGURATION

BACKGROUND OF THE INVENTION

In the injection molding of plastic key tags, the tag body is integrally formed with an integral strap appendage which is subsequently deformed into a loop extending through a metal ring on which keys can be conveniently threaded by the user. To accommodate a suitable fastener, such as an eyelet or rivet, securing the strap in its looped configuration, the strap is provided with longitudinally spaced apertures. For manufacturing efficiency, it is preferable to form these strap apertures during the injection molding operation. To this end, a pair of pins are appropriately positioned in the strap forming portion of the mold cavity. The plastic molding material, injected into the tag body forming portion of the mold cavity, flows around these pins in filling the strap forming portion of the mold cavity. Unfortunately, it is found that complete recombination of the molding material beyond the pin nearest the tag body is not achieved. Rather, there is created in the final product a weakened weld line which extends between the strap aperture created by the pin nearest the tag body and the aperture adjacent the strap free end created by the second pin. When the strap is then secured in a looped configuration, maximum curvature and thus maximum stresses are created in the portion of the strap intermediate the aperture. Typically these stresses eventually cause the strap to split along this weld line. Splitting of the strap obviously detracts from product appeal and in time can jeopardize the integrity of the strap loop.

It is accordingly an object of the present invention to provide a nonsplitting molded plastic strap.

An additional object of the present invention is to provide a plastic strap configuration wherein splitting of the strap between molded apertures therein upon securing the strap in a looped configuration is effectively prevented.

A further object is to provide an injection molded plastic key tag having an integrally formed nonsplitting strap of the above character.

Another object is to provide an improved plastic key tag of the above character which is inexpensive to mass produce and reliable in application.

Other objects of the invention will in part be obvious and in part appear hereinafter.

SUMMARY OF THE INVENTION

In accordance with the present invention there is provided an injection molded plastic strap configuration which resists eventual splitting when deformed into a loop configuration. While the present invention is disclosed in its application to injection molded plastic key tags having an integral strap fastened in a loop extending through a metal key ring, it will be understood that the subject nonsplitting strap configuration may be utilized in other injection molded plastic articles having an integral strap secured in a loop.

In accordance with the present invention, the strap is molded with a relieved surface portion located midway between the lateral strap edges in the region of maximum curvature when the strap is secured in a loop configuration. Moreover, the relieved portion is molded into the strap surface located on the inside of the loop. It is found that by providing a strap relief thusly located, the lateral tensile stress acting to separate the strap material along the weakened weld line created during the injection molding operation is significantly reduced, and consequently splitting of the strap is effectively avoided.

The invention accordingly comprises the features of construction, combination of elements, and arrangement of parts which will be exemplified in the construction hereinafter set forth, and the scope of the invention will be indicated in the claims.

For a fuller understanding of the nature and objects of the present invention, reference should be had to the following detailed description taken in conjunction with the accompanying drawings, in which.

Corresponding reference numerals refer to like parts throughout the several views of the drawings.

DETAILED DESCRIPTION

Figure 1:
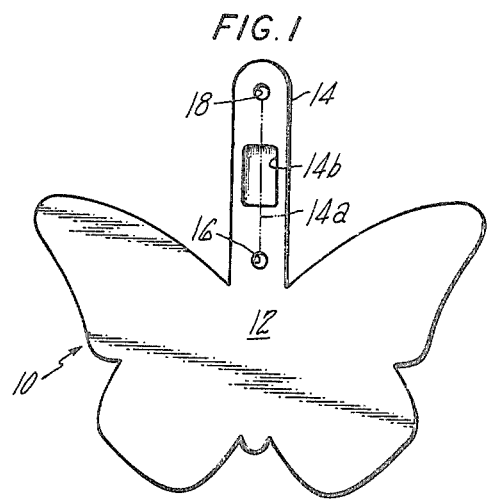
FIG. 1 is a plan view of an injection molded plastic key tag blank formed in accordance with the present invention.
Figure 2:
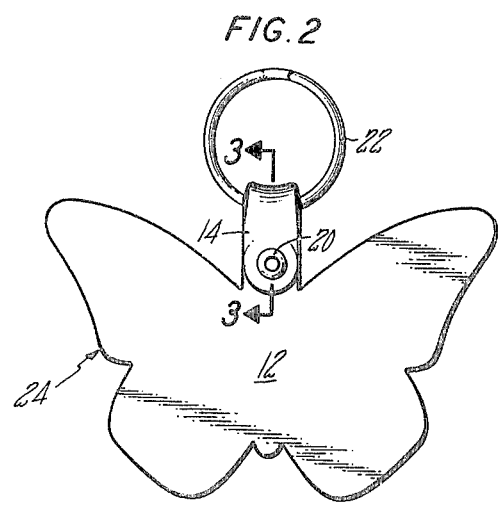
FIG. 2 is a plan view of the blank of FIG. 1 as formed into a plastic key tag.

Turning to the drawings, FIG. 1 illustrates the present invention as embodied in an injection molded, plastic key tag blank 10 having a body 12 of any decorative shape, e.g., a butterfly, and an integral strap 14. Molded into the strap is a pair of apertures 16 and 18 which, as seen in FIG. 2, accommodate a suitable fastener, such as an eyelet 20, securing the strap in a loop extending through a conventional key ring 22 to create a key tag 24. To form blank 12, plastic molding material is injected under pressure into the portion of the mold cavity (not shown) forming the body 12. Pins (not shown) are positioned in the strap forming portion of the mold cavity at the locations where strap apertures are to be formed. The molding material, upon entering the strap forming portion of the mold cavity, must flow around the pin for creating strap aperture 16 and then recombine in filling the remainder of the strap cavity portion. It is found that this recombination creates an imperfect weld line, indicated at 14a in FIG. 1, which is significantly weaker than the remainder of the strap. Prior to my invention, when the strap was secured in a loop, the lateral stresses created in the region of maximum strap curvature typically caused the strap to split along this weakened weld line 14a. The existence of this split in the strap quite naturally detracts from product appeal and conceivably could jeopardize the integrity of the strap loop. In accordance with my invention, splitting of the strap is prevented in an eminently practical and reliable manner.

Figure 3:
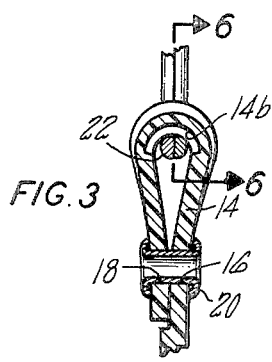
FIG. 3 is a sectional view taken along line 3—3 of FIG. 2.

Specifically, I have found that by simply molding a relief 14b (FIG. 1) in the strap surface to occupy the inside of the strap loop (FIG. 3) in region of maximum strap curvature, i.e., maximum stress region, splitting of the strap along the weakened weld line 14a is effectively prevented. While a detailed stress analysis has not been performed and thus the operative mechanics are not completely understood, a possible explanation for the efficacy of relief 14b in preventing the splitting of the strap will be set forth in conjunction with FIGS. 4 through 6. It is understood that I do not intend my invention as defined in the claims to follow is in any way limited by the accuracy of this explanation.

Figure 4:
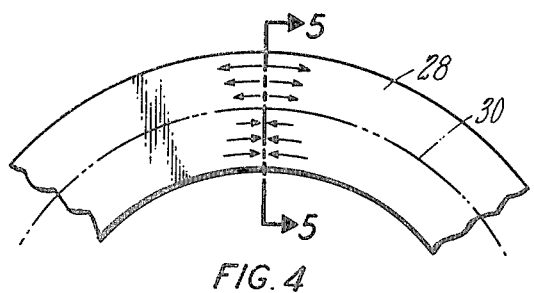
FIG. 4 is a diagrammatic illustration of the longitudinal stresses created upon the bending of a beam.
Figure 5:
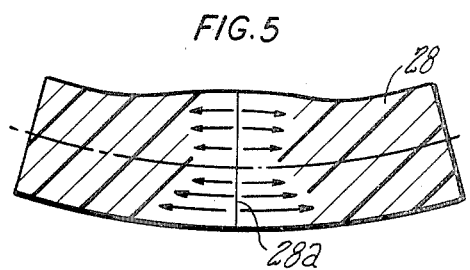
FIG. 5 is a sectional view taken along line 5—5 of FIG. 4 to illustrate the lateral stresses created in the beam.

When a strap 28 of uniform cross-section, i.e. devoid of relief 14b, is deformed in the manner illustrated in FIG. 4, that portion of the strap material above a neutral plane 30 is placed in tension, while the portion of the strap material below the neutral plane is placed in compression. These tensile and compressive stresses increase from zero at the neutral plane to maximum at the strap surfaces, as illustrated by the progressively increasing lengths of the force vectors. In a pure bending situation, Poisson's ratio says that the longitudinal tensile stresses above the neutral axis create lateral compressive stresses, while the longitudinal compressive stresses below the neutral axis create lateral tensile stress. The latter would act to separate the strap material along any weakened longitudinal weld line existing below the neutral axis. Due to the extreme bending situation created when a plastic strap is bent over on itself, a more complex state of stress and strain is believed created, possibly complicated by plastic deformation. It has been observed that when a plastic strap lacking relief 14b is bent on itself into a loop, the extreme longitudinal compressive stress created below the neutral axis in the region of maximum curvature actually causes material displacement to the upper side of the neutral axis. This situation is illustrated in FIG. 5 by the bulge in the upper surface of strap 28. This material displacement, it is believed, creates a lateral tensile stress condition which exceeds the lateral compressive stress condition created by virtue of Poisson's ratio. Thus, as illustrated in FIG. 5, a situation is created wherein the weld line 28a, in the region of maximum strap curvature, is subject entirely to lateral tensile stress both above and below the neutral axis, which are seen to act in opposed directions to completely split the strap along this weld line.

Figure 6:
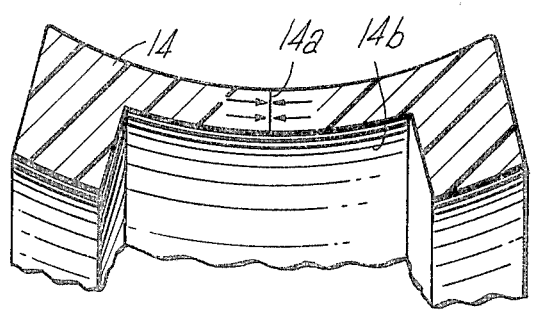
FIG. 6 is a sectional view taken along line 6—6 of FIG. 3 to illustrate the lateral stresses created in the loop strap by virtue of the present invention.

From FIG. 6 it is seen that relief 14b effectively removes the strap material containing the weakened weld line 14b from the region normally subjected to maximum longitudinal compressive stresses and thus, by Poisson's ratio, maximum lateral tensile stresses. Moreover, with this removal of the strap material below the neutral axis in the region of maximum strap curvature, there is no significant material displacement. This is seen in FIG. 6, wherein the upper surface of strap 14 assumes a rather pronounced downwardly bowed or concave configuration. Thus, the lateral tensile stresses accompanying material displacement are essentially avoided, leaving lateral compressive stresses above the neutral axis to act in directions to preserve the strap integrity along weld line 14a. The extent to which the neutral plane is displaced upwardly into the portion of the strap cross-section containing weld line 14a is difficult to predict. However, the lateral tensile stresses acting on the weld line, if not eliminated, are obviously mitigated to a considerable degree, since, with relief 14b, splitting of strap 14 is indeed prevented.

By way of specific example, I have experimentally found that to provide strap 14 with the bending stiffness and tensile strength comparable to a conventional strap lacking relief 14b, it should be approximately ten percent thicker. Thus, for a conventional strap having a thickness of 0.055 to 0.065 inches, strap 14 should have a thickness of 0.070 inches. The relief 14b should be located midway between apertures 16, 18 and midway between its lateral edges. The depth of the relief should be approximately seventy percent of the strap thickness. Consequently for a strap thickness of 0.070 inches, the relief depth can be 0.050 inches. Finally, the longitudinal dimension of the relief can be approximately thirty-five percent of the distance between apertures 16, 18, while the relief transverse dimension can be fifty-five percent of the strap width. Suitable strap materials are polyethylene and polypropylene. Insufficient experimentation has been conducted to attribute criticality to any of these relief specifications, and thus the foregoing is given solely as exemplary of a relief 14b found to be effective in preventing splitting of strap 14 along its weakened weld line 14a. While a rectangular relief is shown, it will be appreciated that other relief configurations may be utilized in practicing the invention.

It is believed that the requisite relief dimensions can be developed mathematically by calculating the moment of inertia and the tensile strength of a conventional strap lacking the relief. Formulas expressing the location of the neutral axis, the bending stiffness, and the moment of inertia of a strap containing such a relief can then be manipulated until a relieved strap cross-section is found having the bottom surface of the relief lying essentially on the neutral axis, together with a moment of inertia and cross-sectional area comparable to that of a conventional strap lacking the relief.

It will thus be seen that the objects set forth above and those made apparent from the foregoing description are efficiently attained, and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A molded plastic article of manufacture comprising, in combination:
   A. a body;
   B. an elongated strap integrally joined with said body, said strap including a longitudinally extending, weakened weld line therein created incidentally with the molding of said body and strap;
   C. means securing said strap in a loop configuration; and
   D. a relief molded in the inside surface of said looped strap at least in the region of maximum strap curvature, said relief being effective in preventing splitting of said strap along said weld line.

2. The plastic article defined in claim 1, which further includes a pair of longitudinally spaced apertures molded in said strap, said securing means consisting of a fastener accommodated through said apertures, and said weld line located in said strap intermediate said apertures.

3. The plastic article defined in claim 1, which further includes a first aperture molded in said strap adjacent its free end and a second aperture molded in one of said strap and body adjacent the junction therebetween, said securing means consisting of a fastener accommodated through said first and second apertures, and said weld line located in said strap intermediate said apertures.

4. The plastic article defined in claim 3, wherein said relief is located midway between said first and second apertures and midway between the lateral edges of said strap.

5. The plastic article defined in claim 3, wherein the depth of said relief is approximately seventy percent of the strap thickness.

6. The plastic article defined in claim 5, wherein said relief is located midway between said first and second apertures and has a longitudinal dimension approximately equal to thirty-five percent of the distance between said first and second apertures.

7. The plastic article defined in claim 6, wherein said relief is located midway between the lateral edges of said strap.

8. The plastic article defined in claim 7, wherein the lateral dimension of said relief is approximately equal to fifty-five percent of the strap width.

9. The plastic article defined in claim 4, wherein said relief is of a generally rectangular shape.

10. The plastic article defined in claim 9, wherein the depth of said relief is approximately seventy percent of the strap thickness.

* * * * *